United States Patent
Iwai et al.

(10) Patent No.: US 10,034,309 B2
(45) Date of Patent: *Jul. 24, 2018

(54) RADIO TRANSMISSION DEVICE AND RADIO TRANSMISSION METHOD

(71) Applicant: Godo Kaisha IP Bridge 1, Tokyo (JP)

(72) Inventors: Takashi Iwai, Ishikawa (JP); Daichi Imamura, Beijing (CN); Sadaki Futagi, Ishikawa (JP); Atsushi Matsumoto, Ishikawa (JP); Tomofumi Takata, Ishikawa (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,418

(22) Filed: Mar. 17, 2017

(65) Prior Publication Data

US 2017/0196023 A1 Jul. 6, 2017

Related U.S. Application Data

(63) Continuation of application No. 14/954,768, filed on Nov. 30, 2015, now Pat. No. 9,635,685, which is a
(Continued)

(30) Foreign Application Priority Data

Jun. 15, 2006 (JP) ................................. 2006-166450
Jan. 12, 2007 (JP) ................................. 2007-005023

(51) Int. Cl.
*H04B 7/216* (2006.01)
*H04W 74/08* (2009.01)
(Continued)

(52) U.S. Cl.
CPC ....... *H04W 74/0833* (2013.01); *H04W 24/08* (2013.01); *H04W 28/0278* (2013.01); *H04W 48/10* (2013.01)

(58) Field of Classification Search
CPC .................................................. H04W 74/0833
(Continued)

(56) References Cited

U.S. PATENT DOCUMENTS 7,398,108 B2 7/2008 Hondo
2001/0055293 A1 12/2001 Parsa et al.
(Continued)

FOREIGN PATENT DOCUMENTS

EP 1954084 A1 8/2008
EP 1976316 A1 10/2008
(Continued)

OTHER PUBLICATIONS

NTT DoCoMo, "Random Access Channel Structure for E-UTRA Uplink," R2-061064, 3GPP TSG-RAN WG1 and WG2 Joint Meeting, Agneda Item: 3.2, Athens, Greece, Mar. 27-31, 2006, 8 pages.
(Continued)

*Primary Examiner* — Shripal Khajuria
(74) *Attorney, Agent, or Firm* — Seed IP Law Group LLP

(57) ABSTRACT

A mobile station includes communication control circuitry that selects a preamble contained in a first Random Access Preamble group when a message size based on data available for transmission does not meet a first condition or when a value calculated based on a reference signal received power of downlink does not meet a second condition, a preamble contained in a second Random Access Preamble group when the message size based on data available for transmission meets the first condition and the value calculated based on the reference signal received power of downlink meets the second condition, and a preamble contained in the third Random Access Preamble group for a handover, independent of the message size based on data available for transmission and the value calculated based on the reference signal received power of downlink. The com-
(Continued)

munication control circuitry also generates and transmits a selected preamble.

27 Claims, 20 Drawing Sheets

Related U.S. Application Data continuation of application No. 14/500,920, filed on Sep. 29, 2014, now Pat. No. 9,232,542, which is a continuation of application No. 14/075,808, filed on Nov. 8, 2013, now Pat. No. 8,982,868, which is a continuation of application No. 12/304,720, filed as application No. PCT/JP2007/061983 on Jun. 14, 2007, now Pat. No. 8,681,763.

(51) Int. Cl.
*H04W 24/08* (2009.01)
*H04W 28/02* (2009.01)
*H04W 48/10* (2009.01)

(58) Field of Classification Search
USPC .......................................................... 370/342
See application file for complete search history.

(56) References Cited

U.S. PATENT DOCUMENTS

| | | |
|---|---|---|
| 2003/0095528 A1 | 5/2003 | Halton et al. |
| 2004/0071194 A1 | 4/2004 | Suwa et al. |
| 2005/0090202 A1 | 4/2005 | Kim et al. |
| 2005/0213497 A1 | 9/2005 | Cho et al. |
| 2006/0140255 A1 | 6/2006 | Jonsson |
| 2007/0230600 A1 | 10/2007 | Bertrand et al. |

FOREIGN PATENT DOCUMENTS

| | | |
|---|---|---|
| GB | 2346779 A | 8/2000 |
| JP | 2000151494 A | 5/2000 |
| JP | 2004266854 A | 9/2004 |
| JP | 2004282653 A | 10/2004 |
| JP | 2006500804 A | 1/2006 |
| JP | 2007068237 A | 3/2007 |
| JP | 2007194749 A | 8/2007 |
| WO | 0036761 A2 | 6/2000 |
| WO | 2007052746 A1 | 5/2007 |

OTHER PUBLICATIONS

Panasonic, "Random access design for E-UTRA uplink," R1-061114, TSG-RAN WG1 Meeting#45, Agenda Item: 111.2, Shanghai, China, May 8-12, 2006, 5 pages.
NTT DoCoMo, Fujitsu, Mitsubishi Electric, NEC, Sharp, Toshiba Corporation, "Random Access Channel Structure for E-UTRA Uplink," R1-061184, 3GPP TSG RAN WG1 Meeting #45, Agenda Item: 11.1.2, Shanghai, China, May 8-12, 2006, 13 pages.
Texas Instruments, "Random Access procedure for E-UTRA," R1-061393, 3GPP TSG RAN WG1 Meeting #45, Agenda Item: 11.1.2, Shanghai, China, May 8-12, 2006, 6 pages.
Nokia "Procedure for non-synchronized random access," R1-062822, 3GPP TSG RAN WG1 #46bis, Agenda item: 6.4.3, Seoul, Korea, Oct. 9-13, 2006, 4 pages.
3GPP TR 25.814 V1.5.0, "3rd Generation Partnership Project; Technical Specification Group Radio Access Network; Physical Layer Aspects for Evolved UTRA (Release 7)," May 2006, pp. 1, 2 and 81.
International Search Report dated Oct. 9, 2007, for corresponding International Application No. PCT/JP2007/061983, 4 pages.
Extended European Search Report dated Dec. 3, 2012, for corresponding EP Application No. 07745240.7-1249/2028871, 6 pages.
Japanese Office Action dated Sep. 13, 2011, for corresponding JP Application No. 2008-521246, 2 pages.

| DL CQI 2BITS | CAUSE 3BITS | SIGNATURE# |
|---|---|---|
| LEVEL 4 | CAUSE 1 | 1 |
| | CAUSE 2 | |
| | CAUSE 3 | |
| | CAUSE 4 | |
| | CAUSE 5 | |
| | CAUSE 6 | |
| | CAUSE 7 | |
| | CAUSE 8 | |
| LEVEL 3 | CAUSE 1 | |
| | CAUSE 2 | |
| | CAUSE 3 | |
| | CAUSE 4 | |
| | CAUSE 5 | |
| | CAUSE 6 | |
| | CAUSE 7 | |
| | CAUSE 8 | ⋮ |
| LEVEL 2 | CAUSE 1 | |
| | CAUSE 2 | |
| | CAUSE 3 | |
| | CAUSE 4 | |
| | CAUSE 5 | |
| | CAUSE 6 | |
| | CAUSE 7 | |
| | CAUSE 8 | |
| LEVEL 1 | CAUSE 1 | |
| | CAUSE 2 | |
| | CAUSE 3 | |
| | CAUSE 4 | |
| | CAUSE 5 | |
| | CAUSE 6 | |
| | CAUSE 7 | |
| | CAUSE 8 | N |

FIG.2

| ACCESS TYPE | DL CQI | SIGNATURE# |
|---|---|---|
| IDLE | LEVEL 6 | 1 |
| | LEVEL 5 | 2 |
| | LEVEL 4 | 3 |
| | | 4 |
| | LEVEL 3 | 5 |
| | | 6 |
| | LEVEL 2 | 7 |
| | | 8 |
| | | 9 |
| | LEVEL 1 | 10 |
| | | 11 |
| | | 12 |
| ACTIVE | LEVEL 4- | 13 |
| | | 14 |
| | | 15 |
| | | 16 |
| | -LEVEL 3 | 17 |
| | | 18 |
| | | 19 |
| | | 20 |
| | | 21 |
| | | 22 |
| | | 23 |
| | | 24 |
| HANDOVER | LEVEL 3- | 25 |
| | | 26 |
| | LEVEL 2 | 27 |
| | | 28 |
| | | 29 |
| | | 30 |
| | LEVEL 1 | 31 |
| | | 32 |
| | | 33 |
| | | 34 |
| | | 35 |
| | | 36 |

FIG.5

| ACCESS TYPE | DL CQI | BUFFER STATUS | NUMBER OF TIMES OF RETRANSMISSION | SIGNATURE # |
|---|---|---|---|---|
| IDLE | LEVEL 4 | | | 1 |
| | | | | 2 |
| | | | | 3 |
| | LEVEL 3 | | | 4 |
| | | | | 5 |
| | | | | 6 |
| | LEVEL 2 | | | 7 |
| | | | | 8 |
| | | | | 9 |
| | LEVEL 1 | | | 10 |
| | | | | 11 |
| | | | | 12 |
| ACTIVE | | LARGE | | 13 |
| | | | | 14 |
| | | | | 15 |
| | | | | 16 |
| | | | | 17 |
| | | | | 18 |
| | | SMALL | | 19 |
| | | | | 20 |
| | | | | 21 |
| | | | | 22 |
| | | | | 23 |
| | | | | 24 |
| HANDOVER | | | 1 | 25 |
| | | | | 26 |
| | | | | 27 |
| | | | | 28 |
| | | | 2 | 29 |
| | | | | 30 |
| | | | | 31 |
| | | | 3 | 32 |
| | | | | 33 |
| | | | | 34 |
| | | | 4 | 35 |
| | | | | 36 |

FIG.6

| ACCESS TYPE | DL CQI | SIGNATURE# |
|---|---|---|
| IDLE | LEVEL 4- | 1 |
| | | 2 |
| | | 3 |
| | | 4 |
| | LEVEL 3 | 5 |
| | | 6 |
| | LEVEL 2 | 7 |
| | | 8 |
| | | 9 |
| | LEVEL 1 | 10 |
| | | 11 |
| | | 12 |
| ACTIVE | LEVEL 4- | 13 |
| | | 14 |
| | | 15 |
| | | 16 |
| | -LEVEL 3 | 17 |
| | | 18 |
| | | 19 |
| | | 20 |
| | | 21 |
| | | 22 |
| HANDOVER | LEVEL 3- | 23 |
| | | 24 |
| | LEVEL 2 | 25 |
| | | 26 |
| | | 27 |
| | | 28 |
| | | 29 |
| | | 30 |
| | LEVEL 1 | 31 |
| | | 32 |
| | | 33 |
| | | 34 |
| | | 35 |
| | | 36 |

⇒

| ACCESS TYPE | DL CQI | SIGNATURE# |
|---|---|---|
| IDLE | LEVEL 4- | 1 |
| | | 2 |
| | LEVEL 3 | 3 |
| | | 4 |
| | LEVEL 2 | 5 |
| | | 6 |
| | | 7 |
| | LEVEL 1 | 8 |
| | | 9 |
| | | 10 |
| ACTIVE | LEVEL 4- | 11 |
| | | 12 |
| | | 13 |
| | | 14 |
| | -LEVEL 3 | 15 |
| | | 16 |
| | | 17 |
| | | 18 |
| | | 19 |
| | | 20 |
| | | 21 |
| | | 22 |
| HANDOVER | LEVEL 3- | 23 |
| | | 24 |
| | LEVEL 2 | 25 |
| | | 26 |
| | LEVEL 1 | 27 |
| | | 28 |
| | | 29 |
| | | 30 |
| | | 31 |
| | | 32 |
| | | 33 |
| | | 34 |
| | | 35 |
| | | 36 |

FIG.10

| ACCESS TYPE | DL CQI | REQUEST | SIGNATURE# |
|---|---|---|---|
| IDLE | LEVEL 4- | | 1 |
| | | | 2 |
| | | | 3 |
| | LEVEL 3 | | 4 |
| | | | 5 |
| | LEVEL 2 | | 6 |
| | | | 7 |
| | LEVEL 1 | | 8 |
| | | | 9 |
| | | | 10 |
| ACTIVE | LEVEL 4- | | 11 |
| | | | 12 |
| | | | 13 |
| | -LEVEL 3 | | 14 |
| | | | 15 |
| | | | 16 |
| | | | 17 |
| | | | 18 |
| HANDOVER | LEVEL 3- | | 19 |
| | LEVEL 2 | | 20 |
| | | | 21 |
| | LEVEL 1 | | 22 |
| | | | 23 |
| | | | 24 |
| | | | 25 |
| CHANGE REQUEST | | NUMBER OF RB CHANGE REQUEST | 26 |
| | | | 27 |
| | | | 28 |
| | | | 29 |
| | | | 30 |
| | | TARGET SIR CHANGE REQUEST | 31 |
| | | | 32 |
| | | | 33 |
| | | | 34 |
| | | | 35 |
| | | | 36 |

FIG.11

| ACCESS TYPE | DL CQI | REQUEST | SIGNATURE# |
|---|---|---|---|
| IDLE | LEVEL 4- | | 1 |
| | | | 2 |
| | | | 3 |
| | LEVEL 3 | | 4 |
| | | | 5 |
| | LEVEL 2 | | 6 |
| | | | 7 |
| | LEVEL 1 | | 8 |
| | | | 9 |
| | | | 10 |
| ACTIVE | LEVEL 4- | | 11 |
| | | | 12 |
| | | | 13 |
| | -LEVEL 3 | | 14 |
| | | | 15 |
| | | | 16 |
| | | | 17 |
| | | | 18 |
| HANDOVER | LEVEL 3- | CHANGE REQUEST | 19 |
| | LEVEL 2 | | 20 |
| | | | 21 |
| | LEVEL 1 | | 22 |
| | | | 23 |
| | | | 24 |
| | | | 25 |
| | LEVEL 3- | | 26 |
| | | | 27 |
| | LEVEL 2 | | 28 |
| | | | 29 |
| | | | 30 |
| | LEVEL 1 | | 31 |
| | | | 32 |
| | | | 33 |
| | | | 34 |
| | | | 35 |
| | | | 36 |

FIG.12

| ACCESS TYPE | DL CQI | SIGNATURE# |
|---|---|---|
| IDLE | LEVEL 4- | 1 |
| | | 2 |
| | | 3 |
| | LEVEL 3 | 4 |
| | | 5 |
| | LEVEL 2 | 6 |
| | | 7 |
| | | 8 |
| | LEVEL 1 | 9 |
| | | 10 |
| | | 11 |
| | | 12 |
| ACTIVE | LEVEL 4- | 13 |
| | | 14 |
| | | 15 |
| | | 16 |
| | | 17 |
| | -LEVEL 3 | 18 |
| | | 19 |
| | | 20 |
| | | 21 |
| | | 22 |
| HANDOVER | LEVEL 3- | 23 |
| | LEVEL 2 | 24 |
| | | 25 |
| | LEVEL 1 | 26 |
| | | 27 |
| | | 28 |
| | | 29 |
| | | 30 |
| OTHERWISE = IDLE | LEVEL 3- | 31 |
| | LEVEL 2 | 32 |
| | | 33 |
| | LEVEL 1 | 34 |
| | | 35 |
| | | 36 |

FIG.14

| ACCESS TYPE | DL CQI | REQUEST | SIGNATURE# |
|---|---|---|---|
| IDLE | LEVEL 4- | | 1 |
| | | | 2 |
| | | | 3 |
| | LEVEL 3 | | 4 |
| | | | 5 |
| | LEVEL 2 | | 6 |
| | | | 7 |
| | | | 8 |
| | LEVEL 1 | | 9 |
| | | | 10 |
| | | | 11 |
| | | | 12 |
| ACTIVE | LEVEL 4- | | 13 |
| | | | 14 |
| | | | 15 |
| | | | 16 |
| | | | 17 |
| | | | 18 |
| | -LEVEL 3 | | 19 |
| | | | 20 |
| | | | 21 |
| | | | 22 |
| HANDOVER | LEVEL 3- | | 23 |
| | LEVEL 2 | | 24 |
| | | | 25 |
| | LEVEL 1 | | 26 |
| | | | 27 |
| | | | 28 |
| | | | 29 |
| | | | 30 |
| OTHERWISE = CHANGE REQUEST | | NUMBER OF RB CHANGE REQUEST | 31 |
| | | | 32 |
| | | | 33 |
| | | | 34 |
| | | | 35 |
| | | | 36 |

FIG.15

| ACCESS TYPE | DL CQI | SIGNATURE# | CODE PATTERN |
|---|---|---|---|
| IDLE | LEVEL 4 | 1 | SPECIFIC CELL CODE |
| | | 2 | |
| | | 3 | |
| | | 4 | |
| | LEVEL 3 | 5 | |
| | | 6 | |
| | LEVEL 2 | 7 | |
| | | 8 | |
| | | 9 | |
| | LEVEL 1 | 10 | |
| | | 11 | |
| | | 12 | |
| ACTIVE | LEVEL 4 | 13 | |
| | | 14 | |
| | | 15 | |
| | | 16 | |
| | -LEVEL 3 | 17 | |
| | | 18 | |
| | | 19 | |
| | | 20 | |
| | | 21 | |
| | | 22 | |
| | | 23 | |
| | | 24 | |
| HANDOVER HO SOURCE : ACK HO DESTINATION : COMPLETION REPORT | LEVEL 3 | 25 | COMMON CELL CODE |
| | | 26 | |
| | LEVEL 2 | 27 | |
| | | 28 | |
| | | 29 | |
| | | 30 | |
| | LEVEL 1 | 31 | |
| | | 32 | |
| | | 33 | |
| | | 34 | |
| | | 35 | |
| | | 36 | |

FIG.16

| ACCESS TYPE | TX POWER MARGIN | BUFFER STATUS | SIGNATURE # |
|---|---|---|---|
| IDLE | LEVEL 4 | | 1 |
| | | | 2 |
| | | | 3 |
| | LEVEL 3 | | 4 |
| | | | 5 |
| | | | 6 |
| | LEVEL 2 | | 7 |
| | | | 8 |
| | | | 9 |
| | LEVEL 1 | | 10 |
| | | | 11 |
| | | | 12 |
| ACTIVE | LEVEL 3- | LARGE | 13 |
| | | | 14 |
| | | SMALL | 15 |
| | | | 16 |
| | -LEVEL 2 | LARGE | 17 |
| | | | 18 |
| | | SMALL | 19 |
| | | | 20 |
| HANDOVER | | | 21 |
| | | | 22 |
| | | | 23 |
| | | | 24 |
| | | | 25 |
| | | | 26 |
| | | | 27 |
| | | | 28 |
| | | | 29 |
| OTHERWISE | | | 30 |
| | | | 31 |
| | | | 32 |
| | | | 33 |
| | | | 34 |
| | | | 35 |
| | | | 36 |

FIG.19

RADIO TRANSMISSION DEVICE AND RADIO TRANSMISSION METHOD

BACKGROUND

Technical Field

The present invention relates to a radio transmitting apparatus and radio transmission method for carrying out RACH (Random Access Channel) transmission.

Description of the Related Art

In 3GPP RAN LTE (Long Term Evolution), studies are being conducted for non-synchronous random access channel (hereinafter referred to as "Async RACH"). Async RACH refers to random access transmitted in a state where uplink synchronization is not established and used in acquiring transmission timings of a mobile station (i.e., uplink synchronization establishment) and reporting a signature (i.e., mobile station identification information) to a base station.

In LTE, studies are being conducted for the structure and transmission method of a preamble transmitted initially in Async RACH, and, by including 4 to 8 bits of control information in a preamble signal in addition to a signature (i.e., mobile station identification information: ID), resource (i.e., time and frequency) use efficiency improves (e.g., see non-patent document 1).

At least a signature is transmitted in the preamble signal. A code pattern of good correlation characteristic with the signature is uniquely associated with the signature in advance, and the mobile station transmits the code pattern associated with the signature selected on a random basis as the preamble signal. By finding the correlations between all code patterns that can be transmitted and a received signal, the receiving side (base station) can detect different signatures at the same time. Further, studies are being underway to improve resource use efficiency by transmitting control information uniquely associated with a signature (e.g., see non-patent documents 2 and 3).

The control information to be transmitted in the preamble includes DL CQI (Downlink Channel Quality Indicator), RACH cause (the purpose of use and the reason for transmission of RACH and RACH access type) and so on (e.g., see non-patent documents 2 and 3).

FIG. 1 shows the steps from RACH transmission to start of data communication described in non-patent document 3. Effects for transmitting control information will be explained as follows.

Immediately after RACH preamble, transmission timing information, DL CH for transmitting resource assignment information and UL CH for transmitting a scheduling request are transmitted. Transmitting DL CQI makes it possible to select an MCS (Modulation and Coding set) according to received quality conditions of UL/DL CH transmitted immediately after RACH preamble. That is, for mobile stations in good reception environment, by selecting an MCS of low redundancy (e.g., 16QAM and high coding rate), it is possible to use resources (time and frequency band) effectively between a plurality of mobile stations.

Moreover, in LTE, the access steps until start of data communication vary according to the purpose of use and the reason for transmission of the RACH, so that, by transmitting a RACH access type (i.e., RACH cause) in the preamble, it is possible to send only information that matches the purpose of use of the RACH, in UL/DL CH immediately after RACH preamble. Consequently, useless information transmission can be omitted and resource use efficiency improves.

In non-patent document 3, transmitting five-bit control information (i.e., two-bit DL CQI+three-bit RACH cause) by a preamble is proposed. To be more specific, as shown in FIG. 2, by associating the control information with a signature, five-bit control information can be transmitted by the signature.

Non-patent Document 1: 3GPP TR25.814 V1.5.0, 9.1.2.1.1.2

Non-patent Document 2: R1-061184, NTT DoCoMo

Non-patent Document 3: R1-061393, Texas Instruments

BRIEF SUMMARY

Problems to be Solved by the Invention

When the rate of occurrence of control information shows bias, providing a small number of signatures results in frequent collisions, so that it is necessary to increase the number of signatures. However, the base station needs to calculate correlation characteristics (i.e., delay profiles) corresponding to the number of signatures at the same time, and so the circuit scale for correlation calculation use increases when the number of signatures increases. On the contrary, if the number of signatures are simply reduced, the amount of control information also decreases, and resource use efficiency is reduced.

It is therefore an object of the present invention to provide a radio transmitting apparatus and radio transmission method for improving resource use efficiency without increasing or decreasing the number of signatures.

Means for Solving the Problem

The radio transmitting apparatus of the present invention adopts a configuration including: a storage section that stores signatures associated with a type and resolution of control information transmitted in a RACH preamble per an access type showing a purpose of use or a reason for transmitting a RACH; a selecting section that selects a signature according to an access type and control information from the storage section; a RACH generating section that generates a RACH in which a code pattern matching the selected signature is a preamble; and a transmitting section that transmits the generated RACH.

The radio transmission method of the present invention includes steps of: selecting a signature stored in association with a type and resolution of control information transmitted in a RACH preamble per an access type showing a purpose of use or a reason for transmitting a RACH according to access types and control information; generating a RACH in which a code pattern matching the selected signature is a preamble; and transmitting the generated RACH.

Advantageous Effect of the Invention

The present invention makes it possible to improve resource use efficiency without increasing or decreasing the number of signatures.

BRIEF DESCRIPTION OF THE SEVERAL VIEWS OF THE DRAWINGS

FIG. 2 shows correspondence relationships between control information and signatures.

FIG. 5 is the signature table according to Embodiment 1 of the present invention;

FIG. 6 is the signature table according to Embodiment 2 of the present invention;

FIG. 10 shows how tables change when the frequency of occurrence of DL CQI=level 1 in "handover" is high;

FIG. 11 is the signature table according to Embodiment 4 of the present invention;

FIG. 12 is other signature tables according to Embodiment 4 of the present invention;

FIG. 14 is the signature table according to Embodiment 5 of the present invention;

FIG. 15 is other signature tables according to Embodiment 5 of the present invention;

FIG. 16 is the signature table according to Embodiment 6 of the present invention;

FIG. 19 shows a modified example of the signature table.

DETAILED DESCRIPTION

Figure 1:
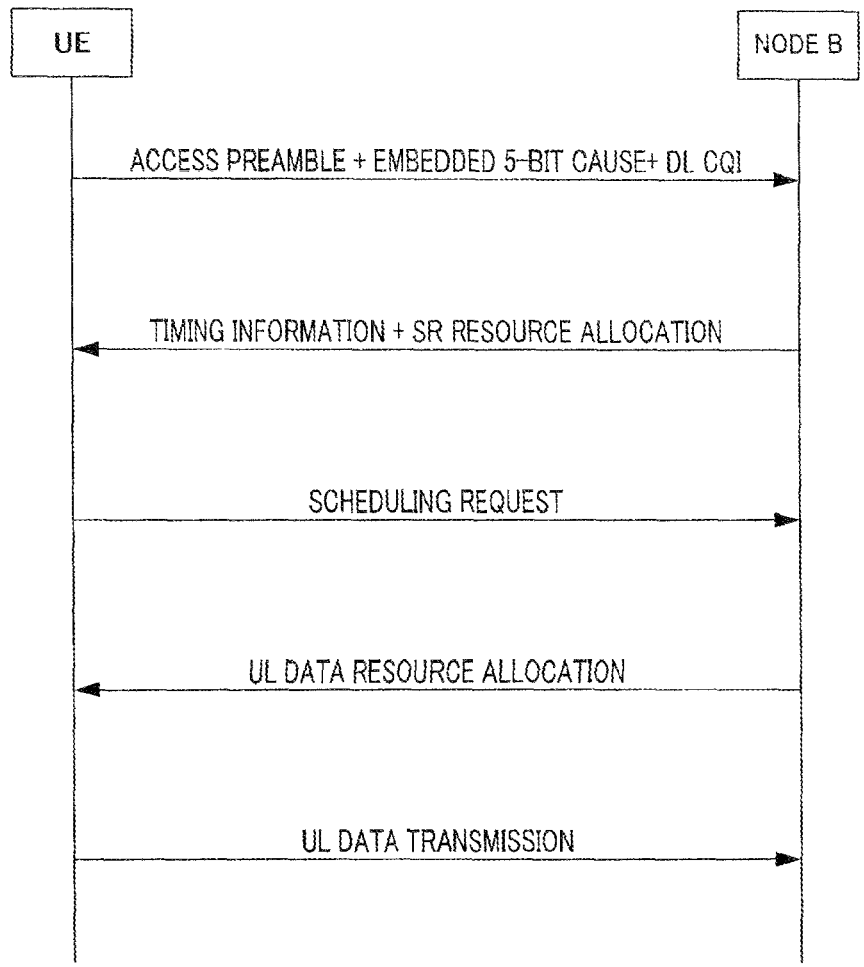
FIG. 1 illustrates a sequence diagram showing the steps from RACH transmission to start of data communication in non-patent document 3.

Now, embodiments of the present invention will be described in detail with reference to the accompanying drawings. Further, in the embodiments, the components having the same functions will be assigned the same reference numerals and overlapping descriptions will be omitted.

Figure 3A:
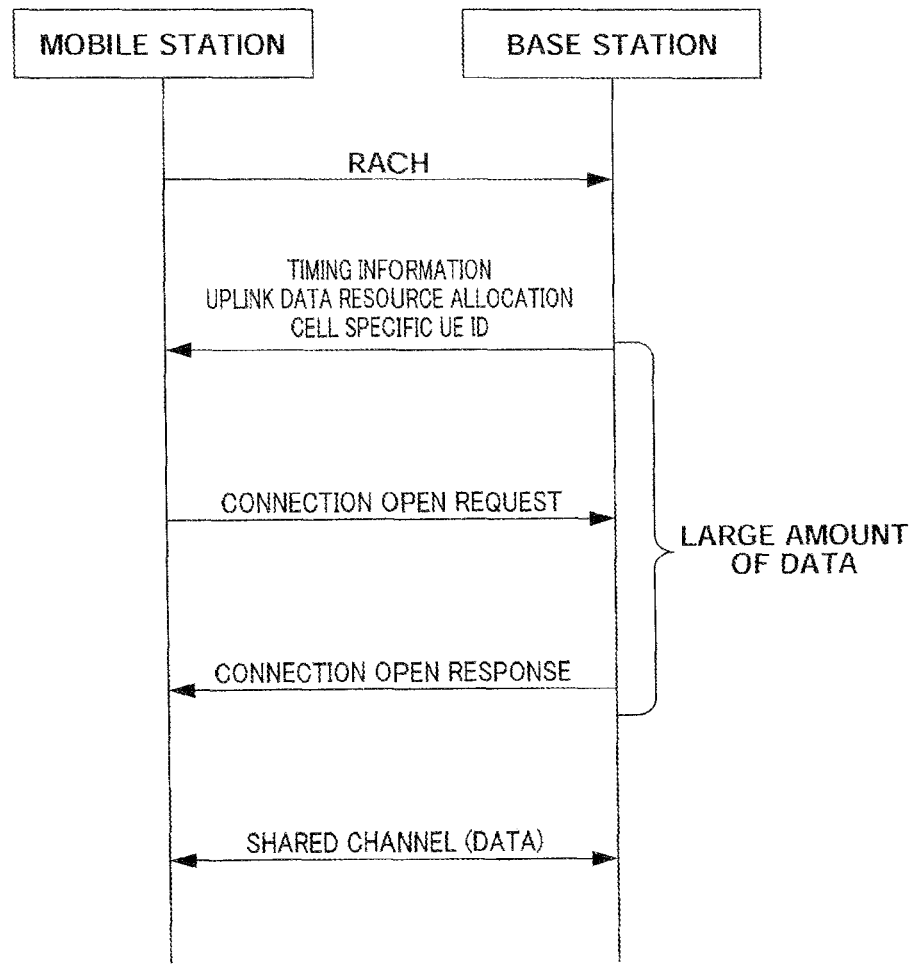
FIG. 3A explains the access type according to the present embodiment.
Figure 3B:
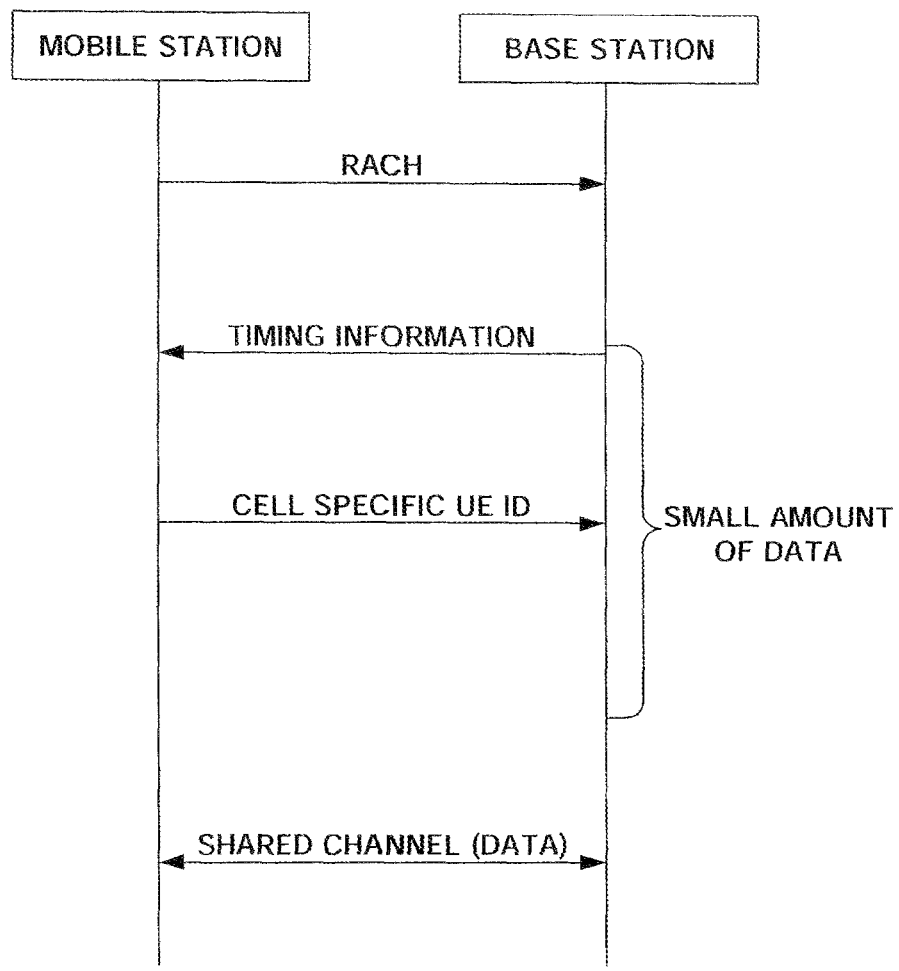
FIG. 3B explains the access type according to the present embodiment.
Figure 3C:
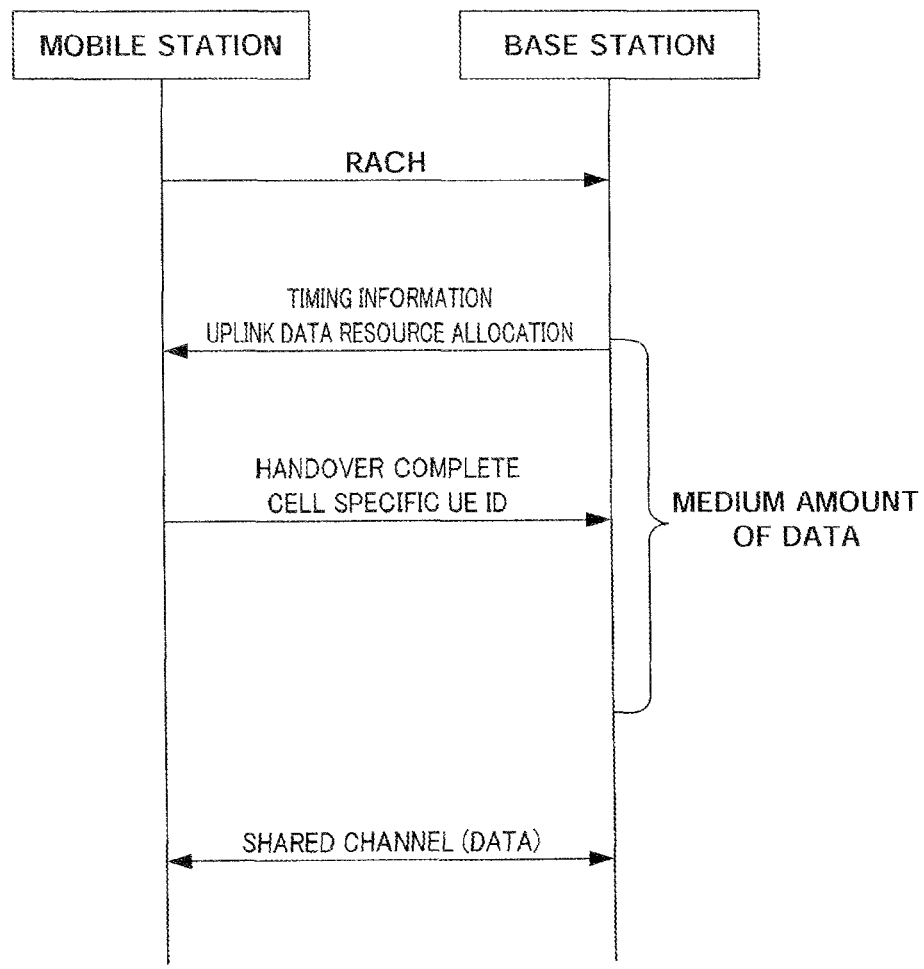
FIG. 3C explains the access type according to the present embodiment.

Here, the access type in the embodiments will be explained. As for the access steps for RACH studied in LTE, for example, the three types shown in FIGS. 3A to 3C are possible. The idle type RACH access steps shown in FIG. 3A, are used in a state where a mobile station does not have a specific ID (i.e., user identification information) in the cell, that is, used in a state where the base station cannot identify the mobile station. The idle type is the access type used upon initial access, when, for example, the mobile station is turned on and registers the location. For this access type, it is necessary to acquire the uplink transmission timing, acquire a specific ID in the cell and set up a connection with the base station by the start of data communication, and a large amount of data is received and transmitted after RACH transmission, before data communication starts. For this reason, the effect of improving resource use efficiency by selecting an optimal MCS in the channel is significantly expected. Consequently, downlink received quality information, which is a reference of selecting an MCS, is the most necessary information.

Next, the active type RACH access steps shown in FIG. 3B are used in a state where the mobile station has a specific ID in the cell, that is, used in a state where the base station can identify the mobile station. The active type is the access type used to reestablish synchronization when, for example, uplink synchronization is failed during data communication (i.e., when uplink reception timing is beyond the CP (cyclic prefix)). It is only necessary to acquire the uplink transmission timing before data communication starts, and a small amount of data is received and transmitted after RACH transmission, before data communication starts. In this type, data communication starts immediately after the transmission timing is detected, so that it is necessary to reduce the duration for data communication by allocating resources according to the data size to transmit. Consequently, transmission data buffer information, which is a reference of resource allocation, is the most necessary information.

Next, the handover type RACH access steps shown in FIG. 3C are used in a state where the mobile station has a specific ID in the cell, that is, used in a state where the base station can identify the mobile station, and are the access type used to report a handover target base station that the handover setup is complete. It is necessary to acquire the uplink transmission timing and report handover completion before data communication starts, and a medium amount of data between the above two access types is received and transmitted after RACH transmission, before data communication starts. In this type, it is necessary to reduce the duration of handover, so that delay time information (e.g., the number of times RACH is retransmitted), which is a reference, is the most necessary information.

In this way, the access steps until the start of data communication vary depending on the purpose of use and the reason for transmission of RACHs, and such variations in the access steps by the start of data communication result in differences in the amount of UL/DL CH data transmitted immediately after the RACH preamble. Moreover, such variations in the access steps result in differences in the types of control information required to set channels transmitted immediately after the RACH preamble.

Embodiment 1

Figure 4:
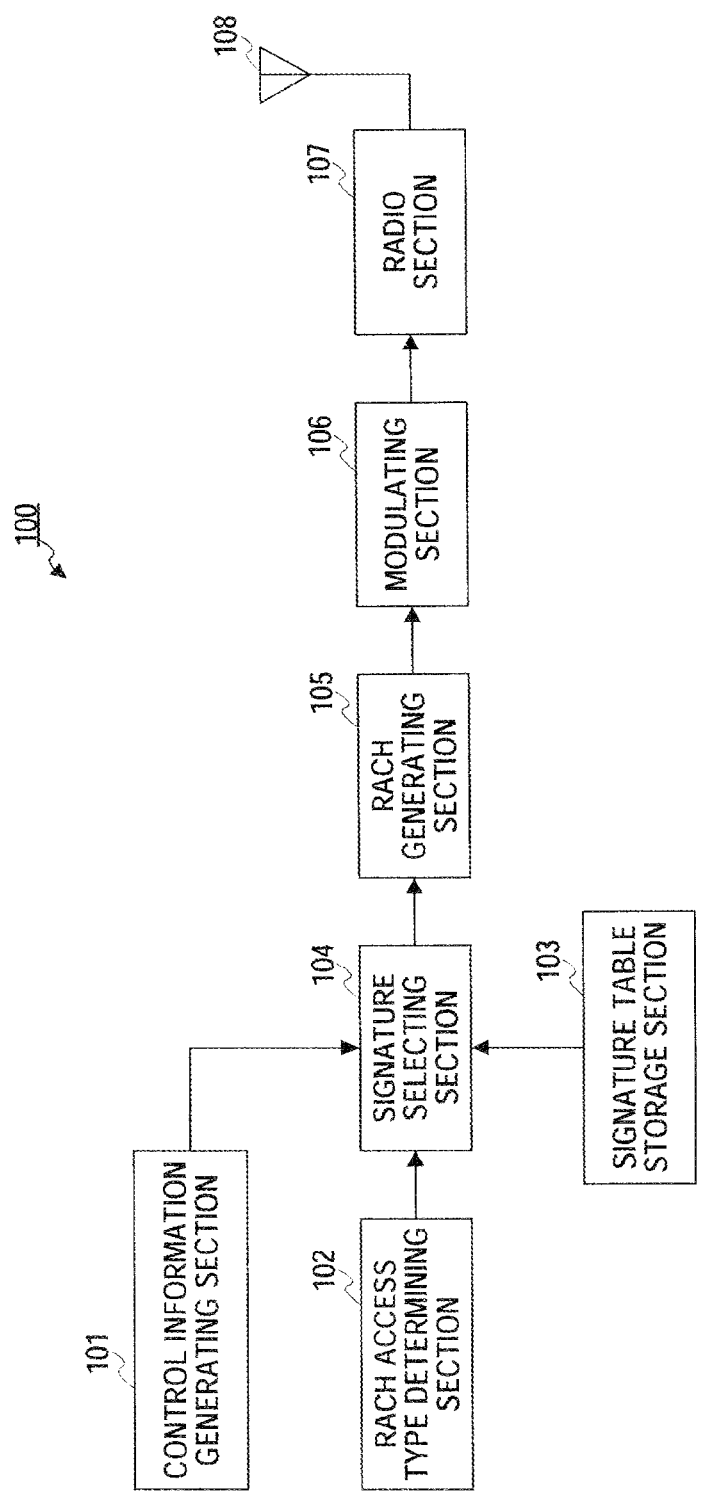
FIG. 4 shows a block diagram showing a configuration of the transmitting apparatus according to Embodiment 1 of the present invention.

FIG. 4 is a block diagram showing the configuration of transmitting apparatus 100 according to Embodiment 1 of the present invention. In this figure, control information generating section 101 measures the received level of a downlink received signal (e.g., common pilot signal), finds the DL CQI based on the measured received level, and outputs the found DL CQI to signature selecting section 104.

RACH access type determining section 102 determines one of a plurality of access types provided in advance based on the purpose of use and reason for transmitting the RACH, and outputs the determined access type to signature selecting section 104.

Signature table storage section 103 stores a table that associates the access type, control information (i.e., DL CQI) and signature, uniquely, and signature selecting section 104 selects a signature. The signature table will be described later.

Signature selecting section 104 selects a signature matching the DL CQI outputted from control information generating section 101 and the access type outputted from RACH access type determining section 102, from signature table storage section 103, on a random basis, and outputs the selected signature to RACH generating section 105.

RACH generating section 105 generates a RACH signal, in which a code pattern matching the signature outputted from signature selecting section 104 is the preamble, and outputs the generated RACH signal to modulating section 106.

Modulating section 106 modulates the RACH signal outputted from RACH generating section 105, and radio section 107 performs predetermined radio transmission processing including D/A conversion and up-conversion on the modulated RACH signal and transmits it from antenna 108.

Next, the signature table described above will be explained using FIG. 5. The signature table shown in FIG. 5 associates the access type, DL CQI and signature uniquely. There are three access types, namely, "idle", "active" and "handover" as described above. The "idle" access type is associated with level 1 to 6 in the DL CQI. Level 6 in the DL CQI is associated with Signature #1 and level 5 in the DL CQI is associated with Signature #2. Level 4 is associated with signatures #3 and #4, level 3 is associated with signatures #5 and #6, level 2 is associated with signatures #7 to #9, and level 1 is associated with signatures #10 to #12.

The "active" access type is associated with the two levels of the level equal to or less than 3 and the level equal to or more than 4 in the DL CQI. The level equal to or more than 4 in the DL CQI is associated with signatures #13 to #16, and the level equal to or less than 3 is associated with signatures #17 to #24, respectively.

Further, the "handover" access type is associated with the three levels of level 1, level 2, and the level equal to or more than 3 in the DL CQI. The level equal to or more than 3 in the DL CQI is associated with signatures #25 and #26, level 2 is associated with signatures #27 to #30, and level 1 is associated with signatures #31 to #36.

Here, if the access type is "idle" and the DL CQI is level 2, signature selecting section 104 selects one of signatures #7 to #9 on a random basis.

In this way, by increasing the resolution of DL CQI (that is, by increasing the number of pieces of information) for the access type where a large amount of UL/DL channel data is transmitted immediately after the RACH preamble, the MCS of higher resource use efficiency can be selected when the channel has a larger amount of data, thereby improving resource use efficiency.

Moreover, the number of signatures associated with one piece of control information is not constant but is determined taking into account the access type and rate of occurrence of control information, so that it is possible to reduce the rate of collision between RACHs.

In this way, according to Embodiment 1, the access type, DL CQI and signature are associated uniquely in a signature table and, the number of levels in DL CQI is set according to the amount of data received and transmitted after RACH transmission, before data communication starts. By this means, the MCS of higher resource use efficiency can be selected when the amount of data of a channel is larger, so that resource use efficiency improves without increasing or decreasing the number of signatures.

Although DL CQI has been explained with the present embodiment as an example, transmission power margin information (i.e., the difference between the maximum transmission power and current transmission power) of a mobile station may be used instead of DL CQI.

Moreover, by determining the scale of resolution taking into account the occurrence rate of individual access types in the signature table, it is possible to improve resource use efficiency. That is, by increasing the resolution of DL CQI for an access type of a higher occurrence rate, the possibility of selecting an MCS of high resource use efficiency increases.

Embodiment 2

The configuration of the transmitting apparatus according to Embodiment 2 of the present invention is the same as shown in FIG. 4 according to Embodiment 1, and this embodiment will be explained with reference to FIG. 4.

FIG. 6 shows the signature table according to Embodiment 2 of the present invention. In this figure, the signature table uniquely associates the "idle" access type with the DL CQI and signature, the "active" access type with the buffer status and signature, and the "handover" access type with the number of retransmissions and signature.

To be more specific, the "idle" access type is associated with the four levels of level 1, level 2, level 3 and level 4 in the DL CQI. Level 4 in the DL CQI is associated with signatures #1 to #3, level 3 is associated with signatures #4 to #6, level 2 is associated with signatures #7 to #9, and level 1 is associated with signatures #10 to #12.

The "active" access type is associated with "large" and "small" of the buffer status. The "large" buffer status is associated with signatures #13 to #18, and the "small" buffer status is associated with signatures #19 to #24.

The "handover" access type is associated with the number of four times of retransmissions #1, #2, #3 and #4. The number of retransmissions 1 is associated with signatures #25 to #28, the number of retransmissions 2 is associated with signatures #29 to #31, the number of retransmissions 3 is associated with signatures #32 to #34, and the number of retransmissions 4 is associated with signatures #35 and #36.

In this way, by transmitting the most necessary information for setting the UL/DL CH transmitted immediately after the RACH preamble as control information, on a per access type basis, it is possible to select an MCS or allocate resources optimal for the access type, thereby improving resource use efficiency.

To be more specific, compared to other access types, in an access type where a large amount of UL/DL CH data is transmitted immediately after the RACH preamble (e.g., the idle type), received quality information of DL (i.e., DL CQI) is transmitted as control information. By this means, in a channel of a large amount of data, it is possible to select an MCS of high resource use efficiency, thereby providing an advantage of significant resource use efficiency.

Moreover, in an access type designed to reestablish synchronization during data communication (e.g., the active type), transmission data buffer information (i.e., buffer status) of the mobile station is transmitted as control information. By this means, by preferentially allocating resources to the mobile station of a high capacity of buffer, it is possible to reduce delay of data transmission.

Further, in an access type designed to report handover is complete (e.g., the handover type), information about the number of retransmissions of the RACH is transmitted as control information. By this means, by preferentially allocating resources to the mobile station of a large number of retransmissions of the RACH (i.e., delay time), it is possible to reduce the duration of handover.

In this way, according to Embodiment 2, by associating the most necessary information for setting the UL/DL CH transmitted immediately after the RACH preamble on a per access type basis in a signature table, it is possible to select an MCS or allocate resources optimal for the access type, thereby improving resource use efficiency without increasing or decreasing the number of signatures.

Embodiment 3

Figure 7:
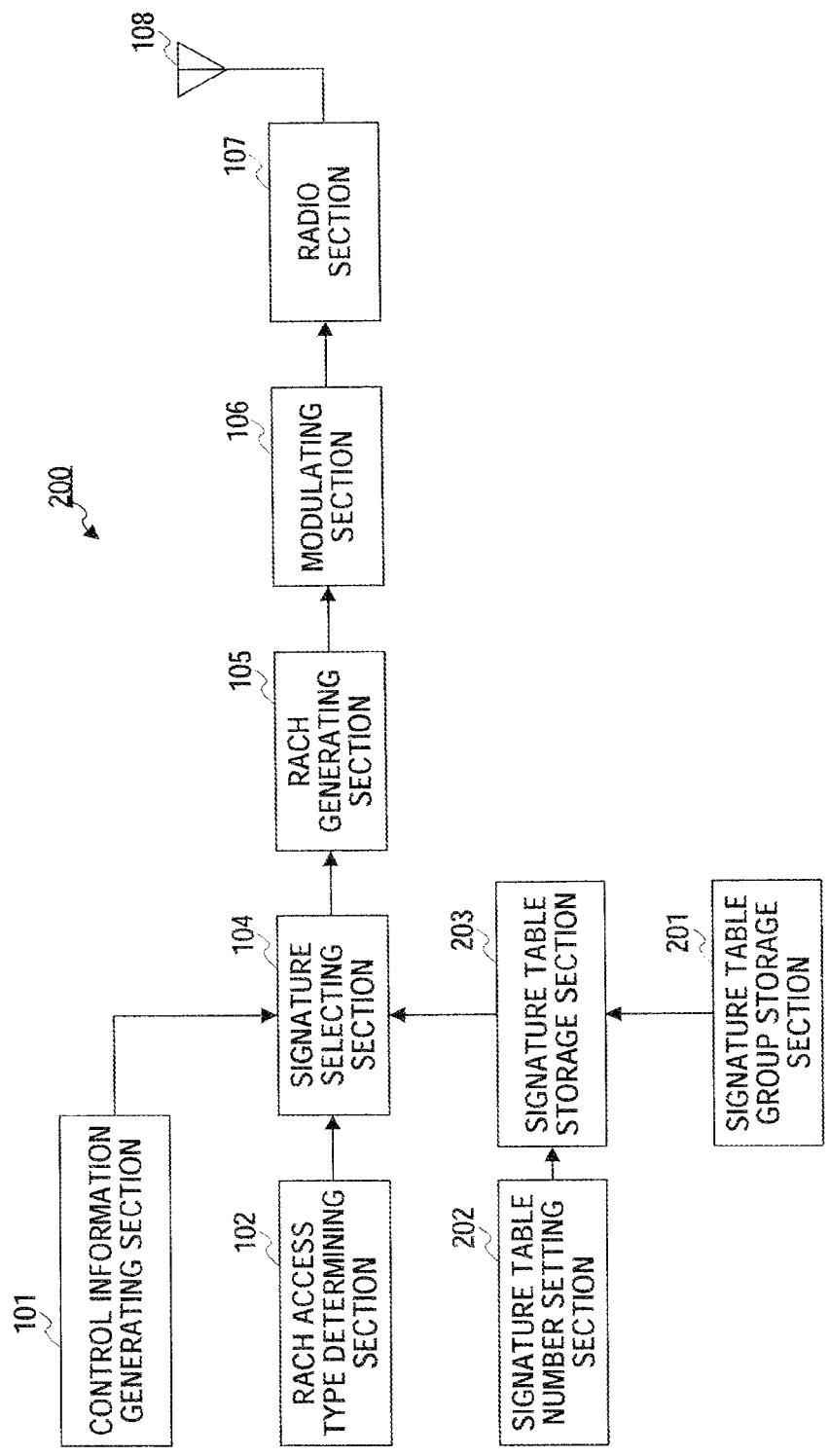
FIG. 7 shows a block diagram showing a configuration of the transmitting apparatus according to Embodiment 3 of the present invention.

FIG. 7 shows the block diagram showing the configuration of transmitting apparatus 200 according to Embodiment 3 of the present invention. FIG. 7 is different from FIG. 4 in adding table number setting section 202 and signature table setting section 203, in changing signature table storage section 103 to signature table group storage section 201.

In FIG. 7, signature table group storage section 201 stores a plurality of tables that associate the access type, control information (DL CQI) and signature, uniquely, and signature setting section 203 selects a signature table. A plurality of signature tables stored here correspond to various communication conditions different on a per cell basis, and are assigned table numbers.

Signature table number setting section 202 acquires a signature table number included in the cell-specific information signaled through, for example, a broadcast channel from a receiving apparatus (i.e., base station), and sets the acquired signature table number in signature table setting section 203.

Signature table setting section 203 selects the signature table associated with the signature table number set by signature table number setting section 202, from signature table group storage section 201, and outputs the selected signature table to signature selecting section 104.

Figure 8:
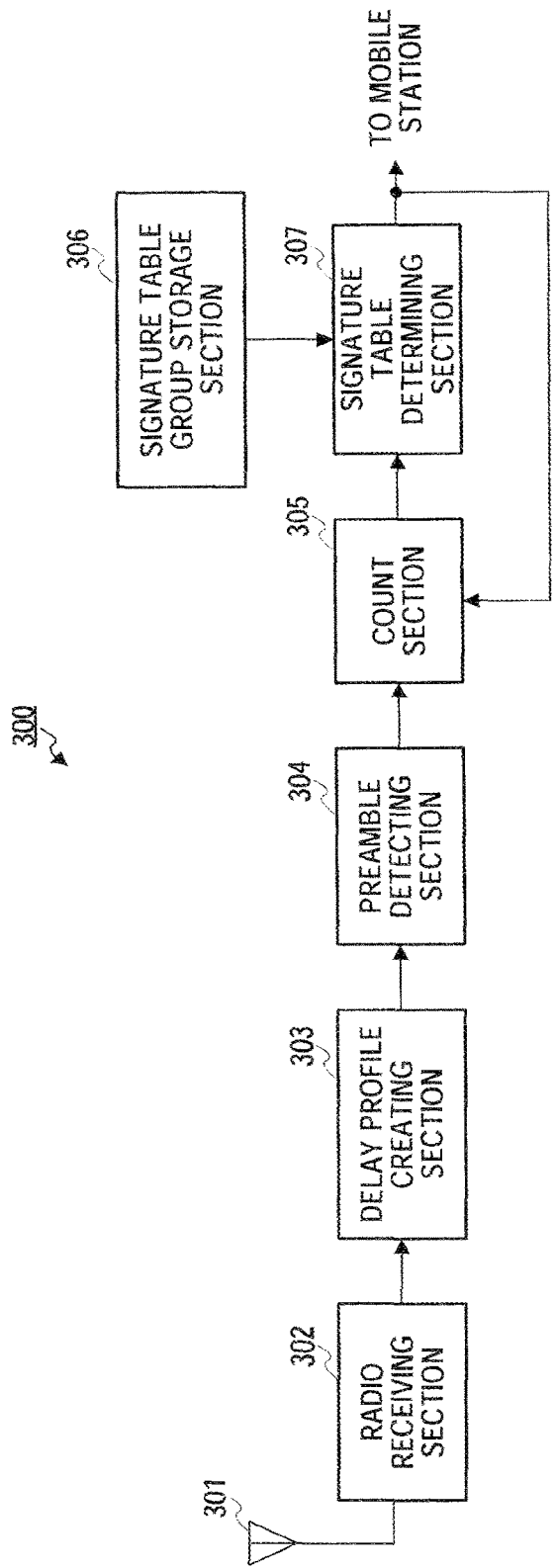
FIG. 8 shows a block diagram showing a configuration of the receiving apparatus according to Embodiment 3 of the present invention.

FIG. 8 is the block diagram showing the configuration of receiving apparatus 300 according to Embodiment 3 of the present invention. In this figure, radio receiving section 302 receives a signal transmitted from transmitting apparatus 200 shown in FIG. 7 via antenna 301, performs predetermined radio receiving processing including down-conversion and A/D conversion on the received signal, and outputs the signal after radio receiving processing to delay profile creating section 303.

Delay profile creating section 303 performs correlation operation between the signal outputted from radio receiving section 302 and a known signal, creates a delay profile, and outputs the created delay profile to preamble detecting section 304.

Preamble detecting section 304 detects a correlation peak in the delay profile outputted from delay profile creating section 303 and makes preamble detection determination by comparing the detected correlation peak with a predetermined threshold. That is, preamble detecting section 304 determines the preamble is detected if there is a correlation peak greater than the predetermined threshold (i.e., the threshold for preamble detection). Upon detecting the preamble, preamble detecting section 304 outputs the signature number included in the detected preamble to count section 305.

Count section 305 detects the access type and control information associated with the signature number outputted from preamble detecting section 304 based on the signature table outputted from signature table determining section 307 (described later). Count section 305 counts the number of detections per access type and per piece of control information, every predetermined time, and outputs the number of detections counted to signature table determining section 307.

Signature table group storage section 306 stores a plurality of the same tables as in signature table group storage section 201 provided in transmitting apparatus 200 shown in FIG. 7, and signature table determining section 307 selects the signature table.

Signature table determining section 307 finds the frequencies of occurrence from the number of detections per access type and per piece of control information, every predetermined time, outputted from count section 305, and, based on the found frequencies of occurrence, determines the most adequate signature table from the signature tables stored in table group storage section 306. Signature table determining section 307 signals the determined signature table to the mobile station in the cell using, for example, a broadcast channel. Further, signature table determining section 307 outputs the determined signature table to count section 305.

Figure 9:
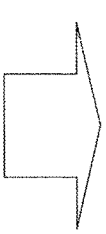
FIG. 9 shows how tables change when the frequency of occurrence of "idle" is high.

Next, the above-described determining method of signature table determining section 307 will be explained. When the frequency of occurrence of "idle" is high in the access types, as shown in FIG. 9, signature table determining section 307 changes a table to the table where the high resolution in control information (e.g., DL CQI) is allocated to the "idle" access type. Further, when the frequency of occurrence of "DL CQI—level 1" in "handover" is high in the access types, as shown in FIG. 10, signature table determining section 307 changes the table to a table where a large number of signatures are allocated to "DL CQI=level 1".

Tables may vary not only based on the frequency of occurrence, but also based on the frequency of collisions between signatures. To be more specific, when preamble detecting section 304 detects signals from a plurality of mobile stations from one preamble, preamble detecting section 304 assumes that a plurality of signatures included in this preamble collide and outputs these signature numbers to count section 305. Here, if the difference between the receiving timings of signal paths is beyond a predetermined threshold, preamble detecting section 304 assumes that one preamble includes the signals from a plurality of mobile stations and a plurality of signatures are collided.

Further, when the above frequency of occurrence or the frequency of collisions varies depending on time (e.g., time frames such as daytime and nighttime), time may be associated with the table and the table may vary according to the time. In this case, count section 305 can be abbreviated.

As for the change of table described above, the number of signatures allocated may be zero. That is, in a plurality of tables stored in signature table group storage sections 201 and 306, there may be a table where the number of signatures is zero as for control information of low frequency of occurrence.

In this way, according to Embodiment 3, the signature table can dynamically change on a per cell basis according to the frequency of occurrence of the access types, control information or the frequency of colliding signatures, so that it is possible to use an adequate signature table according to the conditions of occurrence of the RACHs.

Embodiment 4

The configuration of the transmitting apparatus according to Embodiment 4 of the present invention is the same as shown in FIG. 4 according to Embodiment 1, and this embodiment will be explained with reference to FIG. 4.

FIG. 11 shows the signature table according to Embodiment 4 of the present invention. Here, the "change request" access type is newly provided and associated with the number of RBs (i.e., resource block) change request and target SIR change request. Moreover, the number of RBs change request is associated with signatures #26 to #30, and the target SIR change request is associated with signatures #31 to #36.

The RACH of the "change request" access type requests the base station to change setup parameters with regards to the RACH. For example, a mobile station that is beyond a predetermined number of times of collisions between RACHs transmits the RACH of the "change request" access type, and requests to increase the transmission cycle of the RACH transmission slots (i.e., RBs) or the number of multiplexing RACHs in the frequency domain. Further, a mobile station that is beyond a predetermined number of times the RACH is retransmitted transmits the RACH of the "change request" access type, and requests to increase the target SIR of the RACH transmission power control.

When the base station receives the RACH of the "change request" that the mobile station transmits in a poor receiving environment where the number of retransmissions are greater than a predetermined number of times, the base station may set a smaller threshold value for preamble detection use than the threshold values used in the access types other than "change request." By this means, although the rate of error detections for detecting noise as signals increases, the rate that can detect the RACHs from the mobile stations in the poor receiving environment improves.

The "change request" may be associated with other access types as control information, as shown in FIG. 12.

Figure 13:
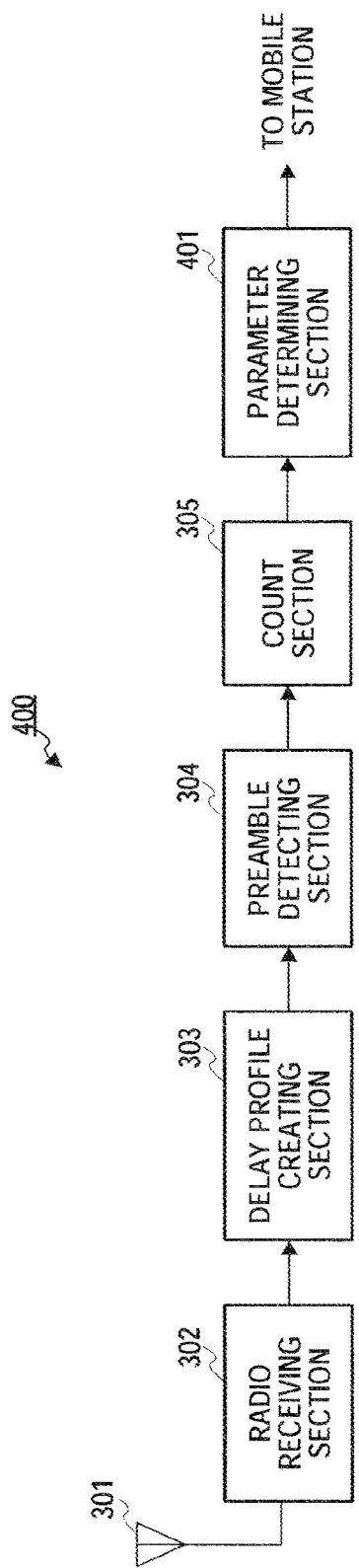
FIG. 13 shows a block diagram showing a configuration of the receiving apparatus according to Embodiment 4 of the present invention.

FIG. 13 shows the block diagram showing the configuration of receiving apparatus 400 according to Embodiment 4 of the present invention. FIG. 13 is different from FIG. 8 in removing signature table group storage section 306 and in changing signature table determining section 307 to parameter determining section 401.

In FIG. 13, when count section 305 reports that the number of preamble detections of the "change request" access type is beyond a predetermined number, parameter determining section 401 changes the parameters that the mobile station requests to change (transmission cycle of RACH transmission slot, the number of multiplexing RACHs in the frequency domain, the target SIR of RACH transmission power control and so on) and signals the changed parameters to the mobile station in the cell using, for example, a broadcast channel.

In this way, according to Embodiment 4, by providing "change request" for requesting to change parameters in the access type and by transmitting in the RACH a specific parameter change request as control information, it is possible to set up parameters adequate for actual RACH use conditions and environment on a per cell basis. Further, by using RACHs for a parameter change request, without performing scheduling for UL synchronization establishment and transmission resources, it is possible to report the base station about the request of mobile stations in simpler steps.

Embodiment 5

The configuration of the transmitting apparatus according to Embodiment 5 of the present invention is the same as shown in FIG. 4 according to Embodiment 1, and this embodiment will be explained with reference to FIG. 4.

FIG. 14 shows the signature table according to Embodiment 5 of the present invention. In this figure, the "otherwise" access type is provided, and an optimal access type is allocated to "otherwise" on a per cell basis. Further, besides "otherwise," the signature table provides the access type defined in advance common to the cells, control information and signature.

An access type, for example, an access type of a large number of frequency of collisions is allocated to "otherwise." For example, when collisions occur between RACHs of the "idle" access type more frequently than RACHs of other access types, as shown in FIG. 14, "idle" is allocated to "otherwise." By this means, it is possible to set the table according to the conditions of occurrence of the RACHs in cells, and reduce the rate of collisions even when the rate of occurrence of the access types shows bias. Further, the access types not allocated to the "otherwise" in advance may be allocated, for example, the above "change request."

Further, information associated with "otherwise" (e.g., "change request" and "idle") defined on a per cell basis is signaled to the mobile stations in the cells using the downlink broadcast channel (BCH).

The configuration of the receiving apparatus of the base station is the same as shown in FIG. 8 according to Embodiment 3, and signature table group storage section 306 may only store part of the signature tables of "otherwise."

In this way, according to Embodiment 5, by providing "otherwise" that can be set freely on a per cell basis, it is possible to set an access type adequate for the conditions of occurrence of the RACHs in the cells. Moreover, not all the table information but part of information alone may be signaled to the mobile station, so that it is possible to reduce the amount of downlink signaling.

Embodiment 6

The configuration of the transmitting apparatus according to Embodiment 6 of the present invention is the same as shown in FIG. 4 according to Embodiment 1, and this embodiment will be explained with reference to FIG. 4.

FIG. 16 shows the signature table according to Embodiment 6 of the present invention. In this figure, the signatures associated with the "handover" access type are generated from a single code sequence and in a common preamble between neighboring base stations (hereinafter simply "common preamble").

Figure 17:
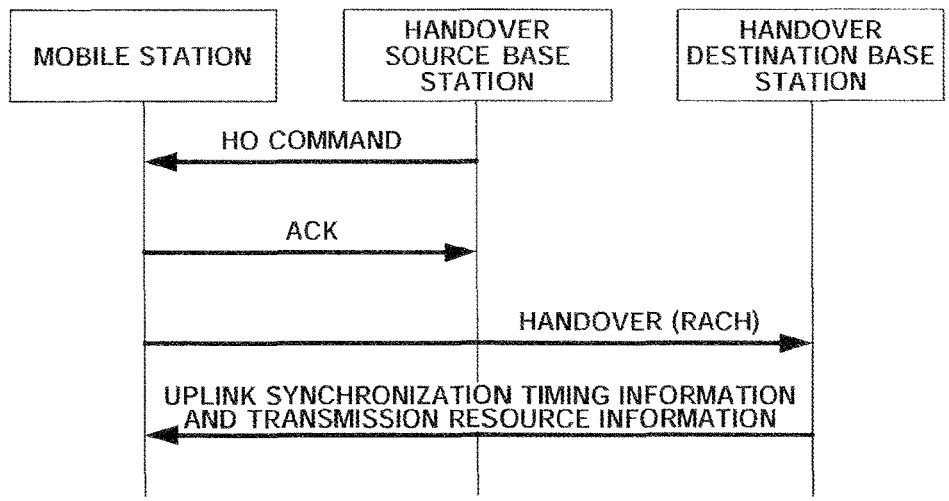
FIG. 17 illustrates a sequence diagram showing the general steps of handover.

First, the general handover steps will be explained using FIG. 17. Based on a received level the mobile station regularly reports, upon determining to hand over the mobile station to a neighboring base station, the base station transmits an HO command urging handover to the neighboring base station. Next, the mobile station receives the HO command and transmits an ACK (i.e., acknowledgement) reporting the designated base station to start handover, to the handover source base station. Further, to report the handover destination base station that the handover setup is complete as described above, the mobile station transmits the RACH and acquires uplink synchronization timing information and transmission resource information.

In the present embodiment, by one time RACH transmission, different pieces of information are transmitted to the handover source base station and the handover destination base station. That is, one RACH is associated with these pieces of information so as to report the handover source base station to the ACK and the handover destination base station that the handover setup is complete.

Figure 18:
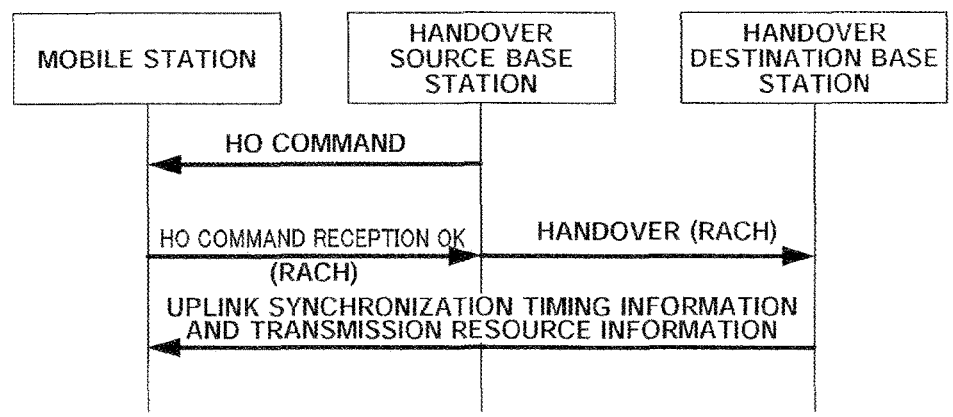
FIG. 18 illustrates a sequence diagram showing the steps of handover according to Embodiment 6 of the present invention.

By this means, as shown in FIG. 18, when the handover source base station receives the RACH of the "handover" access type after a predetermined time passes from the HO command transmitted to the mobile station, the handover source base station determines the RACH designed for ACK. In this case, the handover source base station is not necessary to communicate with the mobile station after that, so that the handover source base station does not respond to the RACH from the mobile station.

On the other hand, upon receiving the RACH of which the purpose is the same as the RACH in the above-described general handover (the purpose for reporting that the handover setup is complete), the handover destination base station transmits the uplink synchronization timing information and transmission resource information to the mobile station.

In this way, according to Embodiment 6, by providing a common preamble of the same code sequence in a plurality of cells, by associating the common preamble with a plurality of different pieces of information for handover source base station and handover destination base station, and by using the common preamble upon handover, it is possible to transmit different pieces of information to the handover source base station and the handover destination base station at the same time. By this means, it is possible to improve resource use efficiency and reduce delay time required for handover.

Although cases have been explained with the embodiments where one kind of pieces of control information is associated with the access types, the present invention is not limited to this, and, as shown in FIG. 19, a plurality of kinds of pieces of control information may be associated with the access types. In FIG. 19, the "active" access type is associated with the transmission power margin (i.e., tx power margin) and buffer status.

Further, although cases have been explained with the embodiments where the access types are associated with one kind of pieces of control information, the present invention is not limited to this, and, as shown in FIG. 19, access types not associated with control information can be provided.

Moreover, although with the embodiments above cases have been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Furthermore, in the above embodiments, the base station and mobile station may be referred to as "Node B" and "UE." Furthermore, in the above embodiments, the access type may be referred to as "cause" or "RACH cause."

The disclosures of Japanese Patent Application No. 2006-166450, filed on Jun. 15, 2006 and Japanese Patent Application No. 2007-005023, filed on Jan. 12, 2007, including the specifications, drawings and abstracts are incorporated herein by reference in their entirety.

Industrial Applicability

The radio transmitting apparatus and radio transmission method according to the present invention can improve resource use efficiency without increasing or decreasing the number of signatures, and are applicable to, for example, a mobile station in mobile communication systems.

The invention claimed is:

1. A base station comprising:
a transmitter configured to broadcast information indicating at least one of:
preamble(s) contained in a first Random Access Preamble group;
preamble(s) contained in a second Random Access Preamble group; and
preamble(s) contained in a third Random Access Preamble group; and
a receiver configured to receive a preamble transmitted by a mobile station,
wherein the first Random Access Preamble group and the second Random Access group are associated with message sizes, and with values calculated based on a reference signal received power of downlink, wherein the message sizes are based on data available for transmission; and
wherein the third Random Access Preamble group is independent of the message sizes, and is independent of the values calculated based on the reference signal received power of downlink.

2. The base station of the claim 1, wherein:
the first Random Access Preamble group is associated with at least one of (1) a first message size that meets a first condition, and (2) a first value calculated based on the reference signal received power of downlink that meets a second condition, and
the second Random Access Preamble group is associated with (1) a second message size that does not meet the first condition, and (2) a second value calculated based on the reference signal received power of downlink that does not meet the second condition.

3. The base station of the claim 1, wherein:
the second Random Access Preamble group is associated with at least one of (1) a first message size that meets a first condition, and (2) a first value calculated based on the reference signal received power of downlink that meets a second condition, and
the first Random Access Preamble group is associated with (1) a second message size that does not meets the first condition, and (2) a second value calculated based on the reference signal received power of downlink that does not meet the second condition.

4. The base station of the claim 1, wherein the first Random Access Preamble group is associated with at least one of (1) a message size based on data available for transmission that does not meet a first condition, and (2) a value calculated based on the reference signal received power of downlink that does not meet a second condition.

5. The base station of the claim 1, wherein the second Random Access Preamble group is associated with (1) a message size based on data available for transmission that meets a first condition, and (2) a value calculated based on the reference signal received power of downlink that meets a second condition.

6. The base station of claim 1, wherein a number of the first preamble(s) included in the first Random Access Preamble group and a number of the second preamble(s) included in the second Random Access Preamble group are determined based on the information.

7. The base station of claim 1, wherein the data available for transmission by the mobile station is indicated as a buffer status.

8. The base station of claim 1, wherein the value calculated based on the reference signal received power of downlink is a downlink Channel Quality Indicator (DL CQI).

9. The base station of claim 1, wherein the value calculated based on the reference signal received power of downlink is a transmission power margin.

10. A method comprising:
broadcasting information indicating at least one of:
preamble(s) contained in a first Random Access Preamble group;
preamble(s) contained in a second Random Access Preamble group; and
preamble(s) contained in a third Random Access Preamble group; and
receiving a preamble transmitted by a mobile station,
wherein, the first Random Access Preamble group and the second Random Access group are associated with message sizes, and with values calculated based on a reference signal received power of downlink, wherein the message sizes are based on data available for transmission, and
wherein the third Random Access Preamble group is independent of the message sizes, and is independent of the values calculated based on the reference signal received power of downlink.

11. The method of the claim 10, wherein:
the first Random Access Preamble group is associated with at least one of (1) a first message size that meets a first condition, and (2) a first value calculated based on the reference signal received power of downlink that meets a second condition, and
the second Random Access Preamble group is associated with (1) a second message size that does not meet the first condition, and (2) a second value calculated based on the reference signal received power of downlink that does not meet the second condition.

12. The method of the claim 10, wherein:
the second Random Access Preamble group is associated with at least one of (1) a first message size that meets a first condition, and (2) a first value calculated based on the reference signal received power of downlink that meets a second condition, and
the first Random Access Preamble group is associated with (1) a second message size that does not meets the first condition, and (2) a second value calculated based on the reference signal received power of downlink that does not meet the second condition.

13. The method of the claim 10, wherein the first Random Access Preamble group is associated with at least one of (1) a message size based on data available for transmission that does not meet a first condition, and (2) a value calculated based on the reference signal received power of downlink that does not meet a second condition.

14. The method of the claim 10, wherein the second Random Access Preamble group is associated with (1) a message size based on data available for transmission that meets a first condition, and (2) a value calculated based on the reference signal received power of downlink that meets a second condition.

15. The method of claim 10, wherein a number of the first preamble(s) included in the first Random Access Preamble group and a number of the second preamble(s) included in the second Random Access Preamble group are determined based on the information.

16. The method of claim 10, wherein the data available for transmission by the mobile station is indicated as a buffer status.

17. The method of claim 10, wherein the value calculated based on the reference signal received power of downlink is a downlink Channel Quality Indicator (DL CQI).

18. The method of claim 10, wherein the value calculated based on the reference signal received power of downlink is a transmission power margin.

19. An integrated circuit comprising:
one or more output nodes, which, in operation, output broadcast information indicating at least one of:
preamble(s) contained in a first Random Access Preamble group;
preamble(s) contained in a second Random Access Preamble group; and
preamble(s) contained in a third Random Access Preamble group; and
one or more input nodes, which, in operation receive a preamble, and
a receiver configured to receive a preamble transmitted by a mobile station,
wherein, the first Random Access Preamble group and the second Random Access group are associated with message sizes, and with values calculated based on a reference signal received power of downlink, wherein the message sizes are based on data available for transmission, and
wherein the third Random Access Preamble group is independent of the message sizes, and is independent of the values calculated based on the reference signal received power of downlink.

20. The integrated circuit of the claim 19, wherein:
the first Random Access Preamble group is associated with at least one of (1) a first message size that meets a first condition, and (2) a first value calculated based on the reference signal received power of downlink that meets a second condition, and
the second Random Access Preamble group is associated with (1) a second message size that does not meet the first condition, and (2) a second value calculated based on the reference signal received power of downlink that does not meet the second condition.

21. The integrated circuit of the claim 19, wherein:
the second Random Access Preamble group is associated with at least one of (1) a first message size that meets a first condition, and (2) a first value calculated based on the reference signal received power of downlink that meets a second condition, and
the first Random Access Preamble group is associated with (1) a second message size that does not meets the first condition, and (2) a second value calculated based on the reference signal received power of downlink that does not meet the second condition.

22. The integrated circuit of the claim 19, wherein the first Random Access Preamble group is associated with at least one of (1) a message size based on data available for transmission that does not meet a first condition, and (2) a value calculated based on the reference signal received power of downlink that does not meet a second condition.

23. The integrated circuit of the claim 19, wherein the second Random Access Preamble group is associated with (1) a message size based on data available for transmission that meets a first condition, and (2) a value calculated based on the reference signal received power of downlink that meets a second condition.

24. The integrated circuit of claim 19, wherein a number of the first preamble(s) included in the first Random Access Preamble group and a number of the second preamble(s) included in the second Random Access Preamble group are determined based on the information.

25. The integrated circuit of claim 19, wherein the data available for transmission by the mobile station is indicated as a buffer status.

26. The integrated circuit of claim 19, wherein the value calculated based on the reference signal received power of downlink is a downlink Channel Quality Indicator (DL CQI).

27. The integrated circuit of claim 19, wherein the value calculated based on the reference signal received power of downlink is a transmission power margin.

* * * * *